(12) United States Patent
Fischbuch et al.

(10) Patent No.: US 11,230,153 B2
(45) Date of Patent: Jan. 25, 2022

(54) CONNECTION, ASSEMBLY, AND METHOD

(71) Applicants: ThyssenKrupp Bilstein GmbH, Ennepetal (DE); thyssenkrupp AG, Essen (DE)

(72) Inventors: Andrej Fischbuch, Herzebrock-Clarholz (DE); Hendrik Münstermann, Ense (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/373,001

(22) Filed: Apr. 2, 2019

(65) Prior Publication Data
US 2019/0308478 A1 Oct. 10, 2019

(30) Foreign Application Priority Data

Apr. 9, 2018 (DE) .......................... 102018108316.5

(51) Int. Cl.
*B60G 13/00* (2006.01)
*B23K 9/10* (2006.01)
*B23K 20/12* (2006.01)
*B23K 26/22* (2006.01)

(52) U.S. Cl.
CPC .......... *B60G 13/005* (2013.01); *B23K 9/1081* (2013.01); *B23K 20/129* (2013.01); *B23K 26/22* (2013.01); *B60G 2204/129* (2013.01)

(58) Field of Classification Search
CPC ............ B60G 13/005; B60G 2204/129; B23K 9/1081; B23K 20/129; B23K 26/22
See application file for complete search history.

(56) References Cited

U.S. PATENT DOCUMENTS

| 2,191,632 | A | * | 2/1940 | Smith | ...................... | F16C 11/04 |
| | | | | | | 403/163 |
| 2,860,230 | A | * | 11/1958 | Rapasky | ................ | B23K 9/007 |
| | | | | | | 219/94 |
| 3,575,448 | A | * | 4/1971 | Licari | ........................ | F16B 5/08 |
| | | | | | | 403/272 |
| 3,624,344 | A | * | 11/1971 | Kutzer | ...................... | F16B 5/08 |
| | | | | | | 219/127 |
| 4,114,246 | A | * | 9/1978 | Kamman | ............ | F16F 15/1442 |
| | | | | | | 156/145 |

(Continued)

FOREIGN PATENT DOCUMENTS

DE 10 2007 037 182 A 2/2008
DE 10 2010 007 237 A 9/2010
(Continued)

*Primary Examiner* — Vishal R Sahni
(74) *Attorney, Agent, or Firm* — thyssenkrupp North America, LLC

(57) ABSTRACT

An assembly for a wheel suspension includes a vibration damper and an add-on part. The vibration damper includes a contact region on which the add-on part is configured to rest and wherein the contact region is configured to receive a force transmitted thereon. A welding element is mechanically connected to the add-on part and welded to the contact region. The contact region and the welding element include the same material or weldable material partners and the add-on part and the contact region are formed from dissimilar and not mutually weldable materials.

19 Claims, 2 Drawing Sheets

(56) References Cited

U.S. PATENT DOCUMENTS

| | | | | |
|---|---|---|---|---|
| 4,872,369 A | * | 10/1989 | Critton | F16F 15/173 |
| | | | | 74/573.1 |
| 6,102,606 A | * | 8/2000 | Muller | F16F 9/3207 |
| | | | | 188/322.17 |
| 8,950,736 B2 | * | 2/2015 | Gustavsson | F16F 7/108 |
| | | | | 267/141 |
| 2006/0051211 A1 | * | 3/2006 | Ferte | B23K 20/129 |
| | | | | 416/213 R |

FOREIGN PATENT DOCUMENTS

| | | | |
|---|---|---|---|
| DE | 10 2009 022 057 A | | 11/2010 |
| DE | 10 2013 215 601 A | | 2/2015 |
| DE | 10 2014 218 765 A | | 3/2016 |
| GB | 1388211 | * | 3/1975 |
| GB | 2050968 | * | 1/1981 |
| JP | 2011153184 | * | 6/2001 |
| WO | WO 9822249 | * | 5/1998 |

* cited by examiner

CONNECTION, ASSEMBLY, AND METHOD

CROSS-REFERENCE TO RELATED APPLICATION

This application is a non-provisional application claiming priority to German Patent Application No. DE 10 2018 108 316.5, which was filed Apr. 9, 2018, the entire contents of which are hereby incorporated by reference herein.

FIELD

The present disclosure generally relates a connection, an assembly, and a method.

BACKGROUND

A connection between a vibration damper and an add-on part for a wheel suspension is known, for example, from DE 10 2010 007 237 A1.

The known connection exists between the vibration damper and a base joint which forms part of the wheel suspension of the motor vehicle. The connection between the vibration damper and the base joint is not specified in more detail.

Connections are usually mechanical connections, for example screw connections or welded connections. The forces arising on vibration dampers in the case of unfavorable installation space conditions require forged parts in order to be linked to the wheel mounts. Forged steel yokes are used to this end, for example. The vibration damper in the assembled state on the lower side can comprise a valve block from aluminium, which contains the damper valves required for the damping function. The lower linkage is screw-fitted or welded to the base of the valve block. The clamping length for the screw connection, by virtue of the requirements in terms of the diameter set for the vibration damper, is limited, or in many cases designed in an unfavorable manner. On account thereof, problems can arise by virtue of settling characteristics.

Thus, a need exists for improving a connection between a vibration damper and an add-on part for a wheel suspension in such a manner that a reliable and strong connection is achieved even in the case of unfavorable installation space conditions. The disclosure is furthermore based on achieving an assembly including a vibration damper and an add-on part, and a method for connecting a vibration damper and an add-on part for a wheel suspension having not mutually weldable materials.

DETAILED DESCRIPTION

Figure 1:
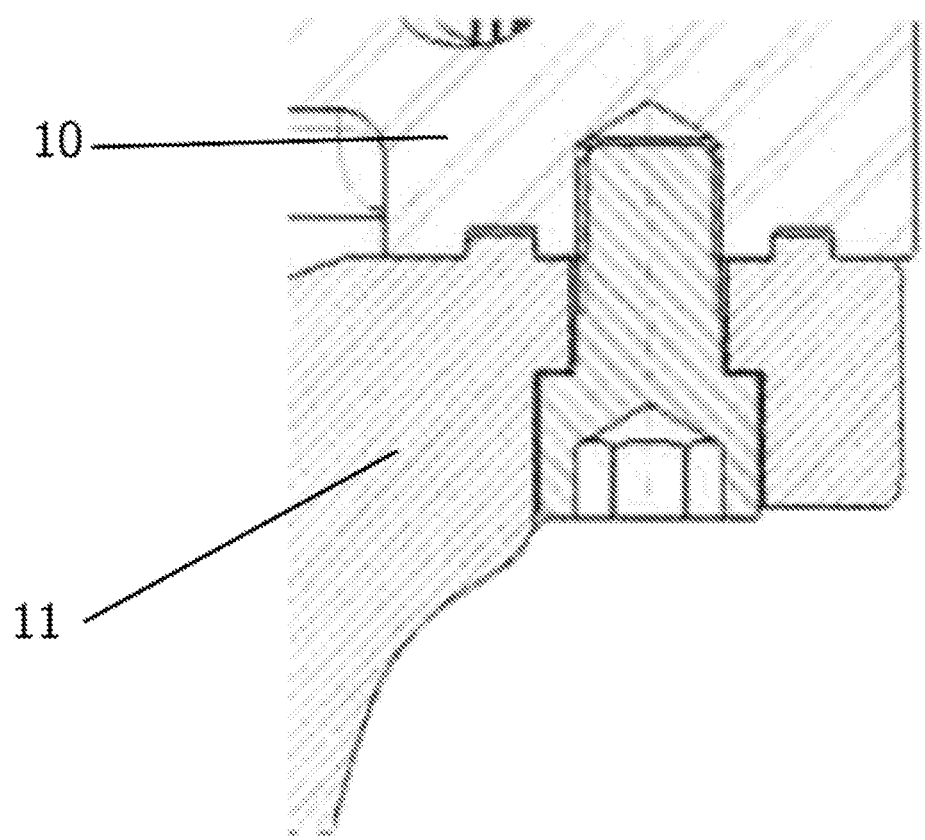
FIG. 1 is a sectional view of a screw connection between a vibration damper and an add-on part as per the prior art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a connection, an assembly, and a method.

A connection between a vibration damper and an add-on part for a wheel suspension, in which the connection of the vibration damper comprises a contact region on which the add-on part rests for a force to be transmitted. In the context of the invention, a welding element which is mechanically connected to the add-on part is provided, on the one hand. The welding element is welded to the contact region, on the other hand. The contact region and the welding element comprise the same material or weldable material partners. The add-on part and the contact region are formed from dissimilar and not mutually weldable materials.

The invention has various advantages.

As opposed to the known screw connection, the threaded bore is dispensed with. The material thickness required for the threaded bore can be reduced in the case of the invention. In other words, the contact region, for example the base of the vibration damper or of a valve block which is part of the vibration damper, can be configured so as to have a smaller wall thickness than in the prior art. The invention has the further advantage that relatively large faces are effective for the welded connection. A relatively high residual pre-load in the connection is generated by the welding procedure and by the compression of the connection partners required when welding.

The materials of the add-on part and of the contact region can be adapted in an optimal manner to the respective component requirements. Forged parts as add-on parts can be used specifically in the case of unfavorable installation space conditions. The material steel has proven successful herein. Other materials having a comparable strength are possible. The contact region can be made from aluminium or an aluminium alloy. Other materials such as, for example, plastics material, are also possible here. The invention enables a welded connection despite said dissimilar, not mutually weldable material pairings, specifically by way of the welding element which is mechanically connected to the add-on part, on the one hand, and welded to the contact region, on the other hand.

It is particularly preferable for the contact region to form a base of the vibration damper, since an optimal linkage of the add-on part for the wheel suspension is possible in this instance. The invention also functions together with other contact regions of the vibration damper in order to connect an add-on part for the wheel suspension to the vibration damper. The external wall of a cylindrical tube of the vibration damper, including the base of the vibration damper, is to be understood as the contact region. The base region of a component which is connected to the cylindrical tube of the vibration damper is also to be understood as the contact region. A laterally attached component, for example a valve block that is laterally flange-fitted to the cylindrical tube, is thus also conceivable as the contact region.

Preferred embodiments of the invention are stated in the dependent claims.

In one particularly preferred embodiment the contact region includes the base of the vibration damper. When the contact region is disposed on the base of the vibration damper said contact region can be particularly well utilized for the linkage to the add-on part.

The add-on part is preferably designed as a lower linkage to the vehicle and can include, for example, a yoke. The add-on part can be designed from various materials, for example steel, aluminium, or plastics material. When the welding element and/or the contact region are/is configured so as to be rotationally symmetrical, said welding element and/or contact region are particularly suitable for being mutually connected by friction welding, since the welding element and/or the contact region can be rotated about a rotation axis. Both components (the welding element and the contact region) thus do not have to be mandatorily configured so as to be rotationally symmetrical. Other geometries are also conceivable, since it is not necessary for both components to rotate about their own axis. One component, for example the welding element or the vibration damper, can be firmly fixed, and the other component for friction welding can rotate about its own axis. The invention is not limited to friction welding. Other welding methods are likewise possible.

The welding element is preferably disposed in a connection opening of the add-on part. In other words, the add-on part surrounds the welding element which in this way can be connected to the add-on part in a simple and stable manner. The connection opening in the add-on part is simple to produce, for example by boring.

In one further preferred embodiment the welding element is connected in a form-fitting manner and/or force-fitting manner to the add-on part. A simple and reliable mechanical connection between the welding element and the add-on part is achieved on account thereof. Other mechanical connections are conceivable.

A relative rotating movement between the welding element and the add-on part is enabled when the welding element comprises a collar which rests on the add-on part, wherein the welding element fixes the add-on part in the axial direction. The welding element in the joined state can thus be welded to the contact region.

The add-on part preferably comprises a clearance in which the welding element, in particular the collar, is disposed. This embodiment enables a stable form-fitting connection which acts in the axial and the radial direction, and for the friction welding enables the relative rotating movement between the add-on part and the welding element.

The welding element and/or the contact region can comprise a welding face. The welding face is preferably to be configured so as to be annular in order for the friction welding to be optimized.

The contact region can comprise an opening. The latter can be configured so as to be concentric with the welding face, and is particularly effective in conjunction with an annular welding face of the welding element. Said opening furthermore serves for receiving excess welding material which is created when friction welding, for example.

The contact region can comprise a receptacle for the welding element, in particular an annular receptacle for a rotating movement of the welding element and/or of the contact region. On account thereof, excess welding material, in particular welding material created by friction welding, is received.

An assembly comprising a vibration damper and an add-on part for a wheel suspension are disclosed and claimed in the context of the invention. In terms of the advantages of the assembly, reference is made to the explanations in the context of the connection between the vibration damper and the add-on part.

A method for connecting a vibration damper and an add-on part for a wheel suspension is furthermore disclosed and claimed in the context of the invention. In the method, a contact region of the vibration damper, a welding element, and the add-on part are joined. The welding element is subsequently connected to the contact region by welding.

In one preferred method the connection between the welding element the contact region is established by friction welding.

One further preferred embodiment of the method includes that the welding element and the contact region are mutually connected by means of capacitor-discharge welding, electron-beam welding, or other conceivable welding methods.

The invention will be explained in more detail hereunder by means of an exemplary embodiment with reference to the appended schematic drawings having more details.

The known mechanical connection according to FIG. 1 includes a vibration damper 10 and an add-on part 11 which is connected to the vibration damper 10 by a screw.

Figure 2:
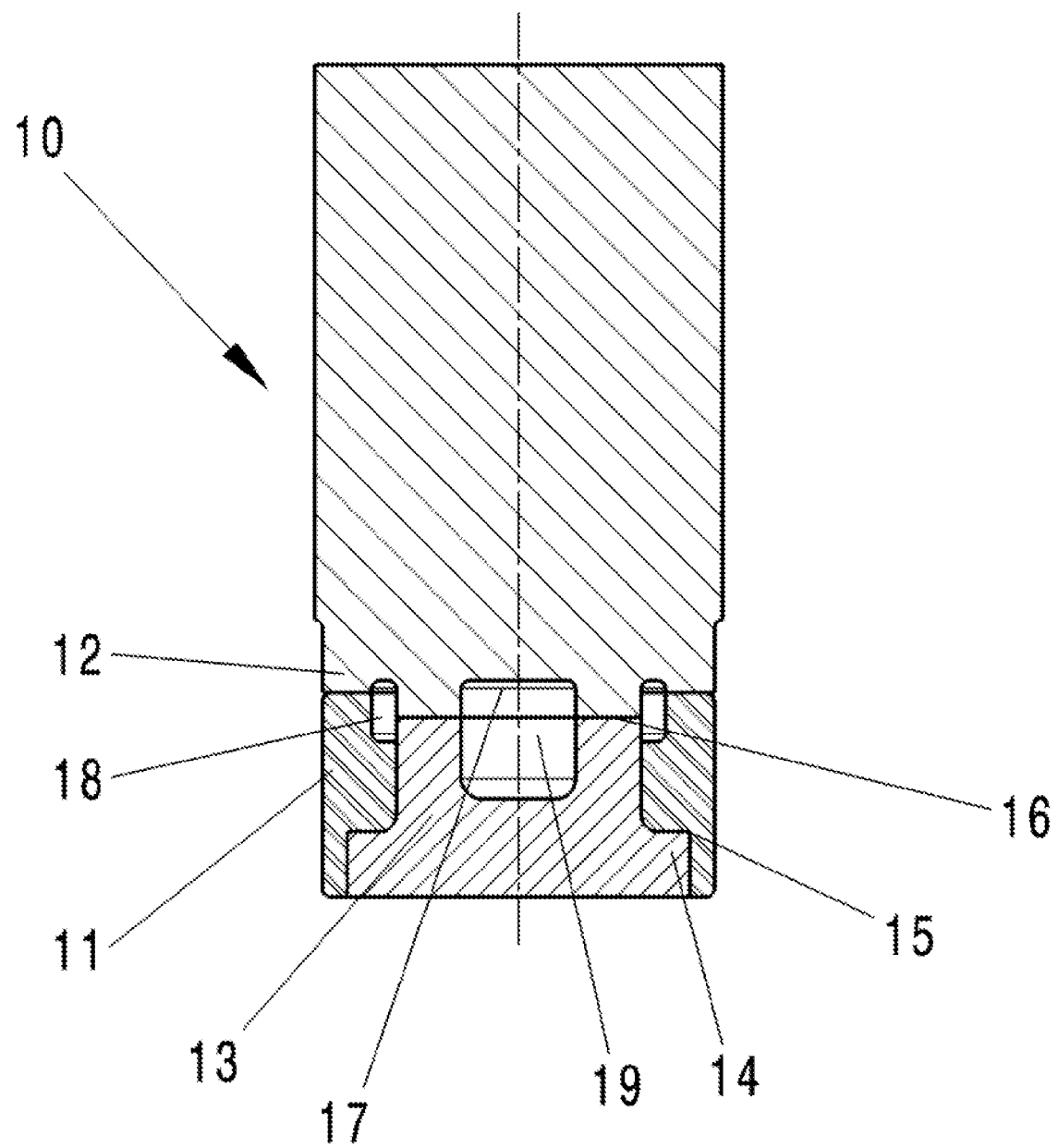
FIG. 2 is a sectional view of a connection as per an exemplary embodiment of the present disclosure between a vibration damper and an add-on part.

The exemplary embodiment according to the invention according to FIG. 2 is a welded connection. This applies to the invention in general.

The connection exists between a vibration damper 10 and an add-on part 11 for a wheel suspension. The add-on part 11 serves for transmitting forces from the wheel suspension to the vibration damper 10. The add-on part 11 can be a steel yoke, for example. Other add-on parts and materials are possible. The vibration damper 10 comprises a contact region 12 on which the add-on part 11 rests. The contact region 12 in the case of the example according to FIG. 2 forms the base of the vibration damper 10. The contact region 12 specifically includes the external face of the cylindrical tube, in particular the base of the vibration damper 10 and/or of a connected component, for example of a valve block that is flange-fitted to the vibration damper laterally or axially below. Alternatively, other components which are connected to the vibration damper are also possible.

The base, or the contact region 12, respectively, is formed from aluminium or from an aluminium alloy. Other light construction materials are possible. The contact region 12 can be made from plastics material, for example.

The connection includes a welding element 13. The welding element 13 has the function of connecting the add-on part 11 to the vibration damper 10, specifically to the contact region 12.

To this end, the welding element 13 is mechanically connected to the add-on part 11. The mechanical connection enables the transmission of force from the add-on part 11 by way of the welding element 13 to the contact region 12. The mechanical connection between the welding element 13 and the add-on part 11 is independent of the material pairing.

The mechanical connection between the welding element 13 and the add-on part 11 can be established in various ways. One example thereof is illustrated in FIG. 2. The welding element 13 comprises a collar 14 which is configured in the shape of a collar on the main body of the welding element 13. The main body of the welding element 13 is bolt-shaped. The collar 14 surrounds the bolt-shaped main body of the welding element 13 on the circumference of the latter. As an alternative, the welding element 13 can be configured so as to be conical, in order to be connectable to the add-on part in a form-fitting and captive manner. In the case of this embodiment it is expedient for the add-on part 11 and the welding element 13 to be firmly clamped. The vibration damper 10 can thus be set in rotation and connected to the welding element 13 by means of friction welding.

The welding element 13 in this embodiment is rotationally symmetrical. Other geometries are also conceivable.

The collar 14 is disposed in a corresponding receptacle, or clearance 15, respectively, of the add-on part 11. The clearance 15 forms an annular shoulder, or an annular depression, respectively, in the end face of the add-on part 11.

In the joint state, a form-fitting connection is formed between the welding element 13, on the one hand, and the add-on part 11, on the other hand. In the assembled state, the welding element 13 is fixedly connected to the contact region 12 such that the add-on part 11 is fixed by the welding element 13. Since a residual pre-load remains after the connection of the welding element 13 to the contact region 12, the mechanical connection between the welding element 13 and the add-on part 11 is form-fitting and force-fitting.

The connection between the welding element 13 and the contact region 12 is a welded connection. In the case of this preferred embodiment the welded connection is established by friction welding, or rotation welding, respectively.

To this end, the welding element 13 is configured so as to be rotationally symmetrical such that said welding element 13 can be rotated in the connection opening of the add-on part 11. The same applies to the collar of the welding element 13, the former permitting a relative rotation between the add-on part 11 and the welding element 13 in the clearance 15.

The connection opening in the add-on part 11 is a bore, the central axis thereof being aligned with the central axis of the contact region 12. Other geometries are possible.

The welding element 13 on that side facing the contact region 12 comprises an annular welding face 16. To this end, a centric bore 19 is disposed in that end side of the welding element 13 that faces the contact region 12. The annular welding face 16 forms the end side of a sleeve-shaped axial end of the welding element 13.

The centric bore 19 in the welding element 13 is aligned with an opening 17 in the contact region 12, said opening 17 being circular in the cross section.

An annular receptacle 18 for the welding material is configured in the connection face between the welding element 13 and the contact region 12, said receptacle 18 serving for reliably trapping welding material that is created in the rotation welding or friction welding, respectively.

The connection face between the contact region 12 on the one hand, and the add-on part 11, on the other hand, is offset in relation to that region of the connection face of the contact region 12 that is in contact with the welding element 13. As can be seen in FIG. 2, the connection face between the contact region 12 and the add-on part 11 is disposed so as to be higher than the connection face between the contact region 12 and the welding element 13. The height differential of the connection faces is even greater prior to the friction welding. Material which is provided by the connection faces which are disposed at dissimilar heights is required for the friction welding. A gap exists between the collar 14 and the clearance 15 prior to the friction welding. The contact region 12 and the welding face 13 are mutually compressed during the friction welding. On account thereof, a form-fit is achieved between the add-on part 11 and the contact region 12, said form-fit causing an additional fixing of the add-on part 11.

The explanations above relate to the connection between the contact region 12 and the add-on part 11, and are also disclosed and claimed in conjunction with the assembly including the vibration damper 10 and the add-on part 11.

In the method as per the exemplary embodiment according to the invention, by way of which the connection according to FIG. 2 is established, the connection partners, that is to say the contact region 12 or the vibration damper 10, respectively, the add-on part 11, and the welding element 13, are joined. The welding element 13 is subsequently rotated and in the axial direction, that is to say in a direction along the central axis illustrated in FIG. 2, is pressed onto the contact region 10. The contact region 12 and the welding element 13 are welded by way of the friction heat created therein.

In the case of the assembly according to FIG. 2, or in the case of the connection according to FIG. 2, respectively, the following connection partners are possible. The contact region 12 and the welding element 13 can both be produced from aluminium or an aluminium alloy which are mutually weldable. The add-on part 11 can be produced from steel which is not mutually weldable to the aluminium of the contact region 12. A further possibility lies in that the add-on part 11, the contact region 12, and the welding element 13 are in each case produced from aluminium alloys, wherein the aluminium alloy of the add-on part 11 is not weldable to the aluminium alloy of the contact region 12. The aluminium alloy of the welding element 13 is weldable to the aluminium alloy of the contact region.

Accordingly, the add-on part 11, the contact region 12, and the welding element 13 can in each case be produced from plastics material, wherein the plastics material composition of the add-on part 11 and the plastics material composition of the contact region 12 are not mutually weldable. The plastics material composition of the welding element 13 is weldable to the plastics material composition of the contact region 12.

LIST OF REFERENCE SIGNS

10 Vibration damper
11 Add-on part
12 Contact region
13 Welding element
14 Collar
15 Clearance
16 Welding face
17 Opening
18 Receptacle
19 Bore

What is claimed is:

1. An assembly comprising:
   a vibration damper;
   an add-on part;
   wherein the vibration damper comprises a contact region on which the add-on part is configured to rest and wherein the contact region is configured to receive a force transmitted thereon; and
   wherein a welding element is mechanically connected to the add-on part and welded to the contact region;
   the contact region and the welding element comprising the same material or weldable material partners, and
   wherein the add-on part and the contact region are formed from dissimilar and not mutually weldable materials,
   wherein the contact region comprises a receptacle for welding material,
   wherein a first surface of the contact region that is welded to the welding element protrudes longitudinally farther away from a remainder of the vibration damper than a second surface of the contact region that is in contact with the add-on part.

2. The assembly of claim 1, wherein the contact region of the vibration damper comprises an opening that is radially inwards of a location where the welded element is welded to the contact region of the vibration damper.

3. The assembly of claim 1 wherein the receptacle in the contact region of the vibration damper is disposed at a first location of the contact region that is radially outwards of a second location of the contact region where the welding element is welded to the vibration damper.

4. The assembly of claim 3 wherein the contact region of the vibration damper comprises an opening disposed at a third location, wherein the third location is radially inwards of the second location of the contact region.

5. The assembly of claim 1 wherein the receptacle is annular and is located radially inwards of a location where the add-on part contacts the contact region.

6. The assembly of claim 1 wherein the contact region of the vibration damper includes an opening that is disposed radially within a portion of the contact region where the welding element is welded to the contact region, wherein the opening includes a cylindrical sidewall and a base defined by the vibration damper.

7. The assembly of claim 6 wherein the base of the opening is longitudinally spaced apart from a surface of the contact region that is welded to the welding element.

8. The assembly of claim 1 wherein a first surface of the contact region that is welded to the welding element is longitudinally offset from a second surface of the contact region that is in contact with the add-on part.

9. The assembly of claim 1 wherein the vibration damper extends along a longitudinal axis, wherein the welding element is solid at a location that is spaced apart from the contact region and that is intersected by the longitudinal axis.

10. The assembly of claim 1 wherein an entirety of a mating surface where the welding element is welded to the contact region of the vibration damper forms a hollowed ring.

11. The assembly of claim 1 wherein the add-on part includes an annular receptacle for welding material.

12. The assembly of claim 11 wherein the annular receptacle is disposed radially between a portion of the add-on part that contacts the contact region of the vibration damper and a portion of the welding element that is welded to the contact region of the vibration damper.

13. The assembly of claim 12 wherein the annular receptacle of the add-on part is radially aligned with the receptacle of the contact region.

14. An assembly comprising:
an add-on part;
a vibration damper that extends along a longitudinal axis and comprises a contact region that mates with the add-on part; and
a welding element that is mechanically connected to the add-on part and is welded to the contact region of the vibration damper along a plane that is orthogonal to the longitudinal axis,
wherein the contact region comprises an opening that is recessed from the plane, with a base of the vibration damper forming a base of the opening, wherein the contact region and the welding element comprise the same material or weldable material partners, wherein the add-on part and the contact region are formed from dissimilar and not mutually weldable materials,
wherein a first surface of the contact region that is welded to the welding element at the plane protrudes longitudinally farther away from a remainder of the vibration damper than a second surface of the contact region that is in contact with the add-on part.

15. The assembly of claim 14 wherein a face of the welding element that is welded to the vibration damper includes a centric bore that is recessed from the plane, wherein the centric bore and the opening in the contact region of the vibration damper are radially aligned.

16. The assembly of claim 14 wherein the opening is disposed radially inwards of a portion of the contact region that mates with the welding element.

17. An assembly comprising:
an add-on part;
a vibration damper that extends along a longitudinal axis and comprises a contact region that mates with the add-on part along a first plane; and
a welding element that is mechanically connected to the add-on part and is welded to the contact region of the vibration damper along a second plane that is orthogonal to the longitudinal axis, with the first and second planes being longitudinally spaced apart, with the second plane being disposed longitudinally farther away from a remainder of the vibration damper than the first plane,
wherein the contact region and the welding element comprise the same material or weldable material partners, wherein the add-on part and the contact region are formed from dissimilar and not mutually weldable materials.

18. The assembly of claim 17 wherein the contact region and the add-on part include receptacles that are radially aligned and are disposed radially outwards of a location where the welding element is welded to the contact region.

19. The assembly of claim 17 wherein the add-on part occupies a space in the second plane that is radially outwards of a welded connection between the welding element and the contact region of the vibration damper.

* * * * *